United States Patent [19]

Cheng et al.

[11] Patent Number: 5,185,853
[45] Date of Patent: Feb. 9, 1993

[54] EXPANDABLE PRINTER BUFFER SYSTEM

[75] Inventors: Shih-Tsun Cheng; Yung-Yen Lee, both of Lungtan Taoyuan, Taiwan

[73] Assignee: Acer Incorporated, Hsin Chu, Taiwan

[21] Appl. No.: 638,834

[22] Filed: Jan. 3, 1991

[51] Int. Cl.$^5$ .......................................... G06K 15/00
[52] U.S. Cl. .................................... 395/115; 395/114
[58] Field of Search ............... 395/101, 115, 116, 112, 395/114, 164, 165; 346/154; 358/444, 404; 340/798, 799

[56] References Cited

U.S. PATENT DOCUMENTS 4,786,923  11/1988  Shimizu ............................... 346/154
5,108,207   4/1992  Isobe .................................... 395/115

Primary Examiner—Arthur G. Evans
Attorney, Agent, or Firm—Greg T. Sueoka

[57] ABSTRACT

A printer buffer system for connecting a number of personal computers and a number of printers includes a master printer buffer and one or more slave buffers, forming an expandable printer buffer system. Each buffer includes an input storage device for storing data, command and status signals from a personal computer or for controlling the transfer of data between the computer and the buffer as well as output storage devices for storing status, command and data signals for the transfer of data between the printer and the buffer and for controlling such transfer. Personal computers and printers may be added or removed from the system at will and the user may select a designated printer.

3 Claims, 4 Drawing Sheets

EXPANDABLE PRINTER BUFFER SYSTEM

BACKGROUND OF THE INVENTION

This invention relates in general to buffers within microcomputer systems and in particular to an expandable printer buffer in use in such systems.

In conventional microcomputer systems, where it is desired for several personal computers to share a printer, a printer buffer is used to connect the personal computers to the printer. Conventionally printer buffers are equipped with a certain number of input ports and output ports. Commonly used printer buffers have four input ports and one output port, for example. First, in order for users of personal computers to share a printer, the four input ports are connected to the four personal computers and the output port of the buffer is connected to the printer. One commonly used interface for controlling the printer buffer is the IBM PS/2 MODEL 80.

The IBM PS/2 MODEL 80 TECHNICAL REFERENCE discloses a parallel port (Centronics Interface). The interface includes the parallel port controller, shown in FIG. 1A. As shown in FIG. 1A, the parallel port controller includes a 25-pin D-shell connector 24 for connection to a printer (not shown), a data I/O buffer 12 for storing data destined for the printer and a control output buffer 14 for storing commands or control signals for controlling the bidirection input and output data flow and a "control wrap and signal input" block 16 which is a storage device for storing the status of the printer.

FIG. 1B is a block diagram of the controller of FIG. 1A and of a personal computer and of a printer connected to the controller to illustrate a conventional printer buffer design. As shown in FIGS. 1A, 1B, controller 10 includes three storage devices: a data storage 12, a control storage 14 and a status storage 6. Data storage 12 stores data from the personal computer destined for the printer 22. The controller also includes a D-shell connecter 24 for connection to printer. Each of the three storage devices are adapted to receive 8 bits of parallel data.

The parallel port interface illustrated in FIGS. 1A-1B has three ports: a data port 12a, a command or control port 14a and a status port 16a. The three ports respond to five I/O instructions: two outputs and three inputs instructions. The output instructions transfer data into the data or control ports from computer 20 while the input instructions allow the computer to read back the contents of any one of the three ports.

In FIGS. 1A-1B, storage devices 12, 14 and 16 may simply be latches and that their contents would readily appear at the ports 12a, 14a, obvious that status port 16a is a read-only port and that the flow of status signals is in one direction only: from the printer 22, through connector 24 and stored in status storage 16. The status signals stored is then read by computer 20 through bus 26. Each of the three ports receives 8 bits of parallel data. The definition of the 8 bits of the status port 16a are listed below.

Status Ports

The Status port is a read-only port. A read operation to this port presents the system microprocessor with an interrupt-pending status of the interface, and the real-time status of the connector pins. An interrupt is pending when bit 2 is set to 0.

| Bit | Ports Data |
|---|---|
| 7 | —BUSY |
| 6 | —ACK |
| 5 | PE |
| 4 | SLCT |
| 3 | ERROR |
| 2 | —IRQ STATUS |
| 1,0 | Reserved |

Comments

Bit 7—This bit represents the state of '-busy' signal (-BUSY). When this signal is active, the printer is busy and cannot accept data.

Bit 6—This bit represents the current state of the printer 'acknowledge' signal (-ACK). When this bit is set to 0, the printer has received a character and is ready to accept another.

Bit 5—This bit represents the current state of the printer 'paper end' signal (PE). When this bit is set to 1, the printer has detected the end of the paper.

Bit 4—This bit represents the current state of the 'select' signal (SLCT). When this bit is set to 1, the printer has been selected.

Bit 3—This bit represents the current state of the printer '-error' signal (-ERROR). When this bit is set to 0, the printer has encountered an error condition.

Bit 2—When this bit is set to 0, the printer has acknowledged the previous transfer using the '-acknowledge' signal. An interrupt is pending when bit 2 (-IRQ STATUS) is set to 0.

Bits 1,0—These bits are reserved.

Parallel Control Port

The Parallel Control port is a read/write port. A write operation to this port latches bits 0 through 5 of the bus. A read operation to parallel control port presents the system microprocessor the data that was last written to it, except for the write-only direction bit.

The bit definitions of the parallel control or command port 14a are as follows:

| Bit | Ports Data |
|---|---|
| 7, 6 | Reserved = 0 |
| 5 | Direction |
| 4 | IRQ EN |
| 3 | Pin 17 (SLCT IN) |
| 2 | Pin 16 (—INIT) |
| 1 | Pin 14 (AUTO FD XT) |
| 0 | Pin 1 (STROBE) |

Comments

Bits 7,6—These bits are reserved and must be set to 0.

Bit 5—This write-only bit controls the direction of the data port. When this bit is set to 0, the data port is written to. When this bit is set to 1, the data port is read from.

Bit 4—This bit enables the parallel port interrupt. When this bit is set to 1, an interrupt occurs when the '-acknowledge' signal changes from active to inactive.

Bit 3—This bit controls the 'select in' signal (SLCT IN). When this bit is set to 1, the printer is selected.

Bit 2—This bit controls the 'initialize printer' signal (-INIT). When this bit is set to 0,the printer starts.

Bit 1—This bit controls the 'automatic feed XT' signal (AUTO FD XT). When this bit is set to 1, the printer automatically spaces the paper up one line for every line return.

Bit 0—This bit controls the 'strobe' signal (STROBE) to the printer. When this bit is set to 1, data is clocked into the printer.

In the above described conventional design, four personal computers share one printer 22; three additional personal computers (not shown in FIG. 1B) are also connected to bus 26. When a user of anyone of the four computers wishes to transfer data to printer 22, the user causes one of the computers such as computer 20 to send a control word to control port 14a. Bits 0,3 of the control word have to be set to 1. The bit 0 (STROBE bit) of the control port controls a "STROBE" signal (pin 1 of D-shell connector 24) to the printer. When this bit is set to 1, data is clocked into the printer. The STROBE signal may be generated by software or hardware and is easily implemented by those skilled in the art. The bit 3 (SLCT IN bit) controls a "select in" signal (pin 17 of D-shell connector). When this bit is set to 1, the printer is selected.

When a printer 22 is busy printing data originating from one of the four personal computers, it will be inaccessible to any one of the personal computers. Hence it is desirable for the personal computers to be able to interrogate controller 10 to discover if printer 22 is busy or idle. For this purpose, printer 22 returns a real-timed status signal to status storage 16 representing the current state of the printer; this status signal is carried through pin 10 of the D-shell connector for carrying the "acknowledge" signal. Alternatively the four personal computers may adopt a polling method to detect bit number 6 from the status port 16a, in order to identify whether the personal computer may send out data to controller 10. Alternatively, printer 22 may also directly use the "acknowledge" signal carried on pin 10 of D-shell connector 24 as an interrupt signal to inform the personal computers to send out further data.

In the above described conventional printer buffer system, the printer buffers are typically configured to connect a fixed number of personal computers to one printer. When a user wishes to connect an additional personal computer as an additional data source to the same printer, the printer buffer with only four input ports need to be replaced by a printer buffer having 8 input ports. Alternatively, this additional personal computer would require an additional printer. The above described printer buffer system is wasteful of resources and lacks the flexibility for users to reconfigure at will the sharing arrangement between the number of personal computers and printers. It is therefore desirable to provide an improved printer buffer system where the above described difficulties are alleviated.

SUMMARY OF THE INVENTION

This invention is based on the observation that by employing a micro-controller to detect the status of the printers and signals originating from the personal computers, a much more flexible and economical printer buffer system is achieved. For this purpose, the printer buffers are equipped with storage devices for storing the current status information of the printer and for data destined for the printer. Such storage device is connected to the output port which in turn is connected to the printer. The buffer also includes storage devices for storing the data, status and command signals originating from personal computers. These storage devices and the micro-controller are connected by a bus so that the controller may interrogate these storage devices to determine whether one or more of the personal computers are currently waiting for use of a printer and whether any of the printers is idle and thus available to receive data from a personal computer for printing. Each buffer may include one or more input ports and one or more output ports. Therefore, if the new system user wishes to add a personal computer as a data source, all the user would have to do is to connect the computer to an unused input port of the buffer or add a printer buffer and connect it to the computer and to the system buffer.

This invention is directed towards an expandable printer buffer system for controlling the flow of data from a plurality of data sources to one or more printers in response to data, status and command signals from the data sources. The system comprises a plurality of buffers and a bus connecting the buffers. Each buffer has at least one or more input ports and one or more output ports. Each input port is connected to and receives signals from a data source. Each output port is connected to a printer. Each of the buffers includes a first and a second storage means. The first storage means stores status signals for the printer connected to the output port of such buffer to indicate whether such printer is busy or idle. The first storage means also stores data signals destined for such printer. The second storage means stores data, status and command signals from the data source. The system further includes a controller means connected to the bus for interrogating the first and second storage means of the buffers through said bus in order to detect whether the second storage means of any buffer stores any data signals provided by the data source and whether the first storage means stores any status signals indicating that any printer connected to any of the buffers is idle. The controller means causes data signals stored in the second storage means of any of the buffers to be transferred to the first storage means of a buffer when the status signals stored in said first storage means of such buffer indicates that the printer connected to such buffer is idle so that the data signals are available to such printer for printing.

DETAILED DESCRIPTION OF THE INVENTION

Figure 2:
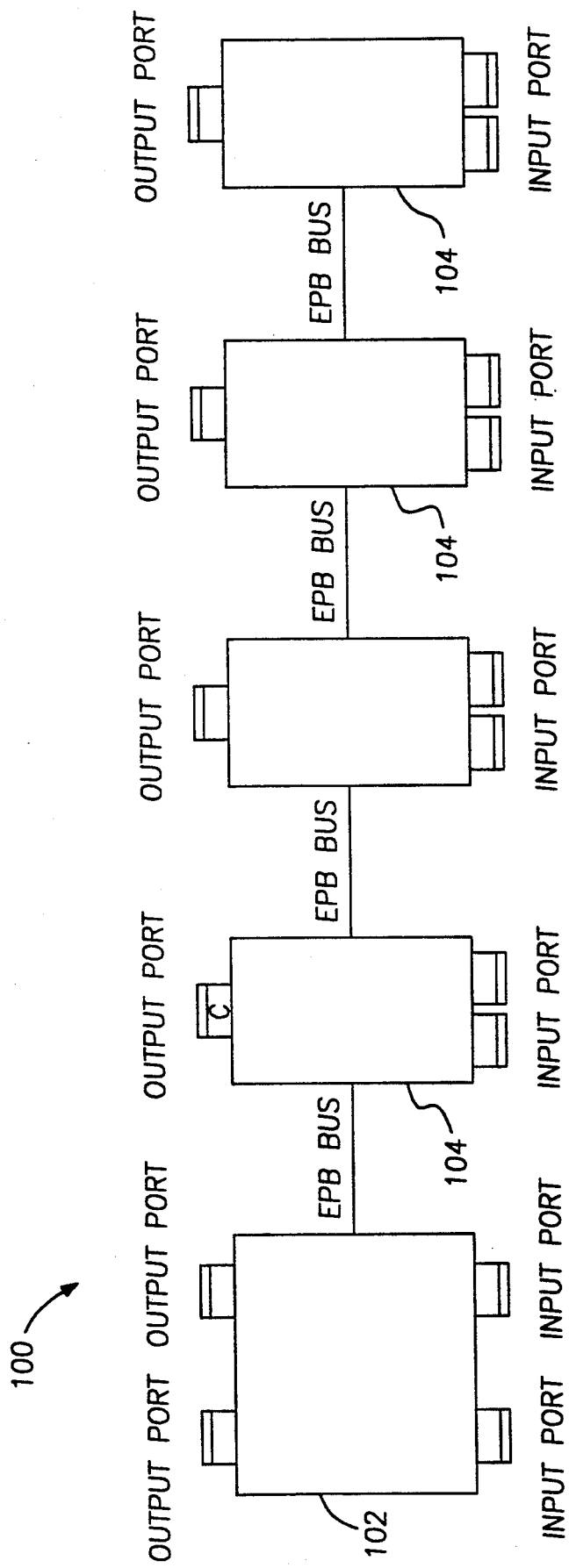
FIG. 2 is a block diagram of an expandable printer buffer system illustrating the invention.

FIG. 2 is a block diagram of the printer buffer system illustrating the invention. As shown in FIG. 2, system 100 includes a master buffer 102 and slave buffers 104. Buffer 102 has two input ports and two output ports while buffers 104 each has two input ports and an output port. It will be obvious that the buffers 102, 104 may have different numbers of input and output ports, as long as they each have one input and one output port. All such variations are within the scope of the invention. As shown in FIG. 2, the buffers are connected by an expandable printer bus (EPB). The EPB bus contains lines carrying the following signals.

|  | Bits | Definition |
| --- | --- | --- |
| D0-D7 | 8 | Data Path |
| A0-An | n+1 | Address of n+1 storage devices in buffers |
| INT0-INTm | m+1 | interrupt |
| R/W | 1 | read/write control |
| INIT | 1 | initialize printer |
| VCC&GND | 6 |  |

The address bits A0-An are used to enable the CPU 111 to select particular registers in the master and slave buffers. Thus, each of the status, command and data registers in storage device 120 has a particular address, so that each of such registers is individually addressable and accessible by CPU 111 through the EPB bus and bus 122.

Figure 3:
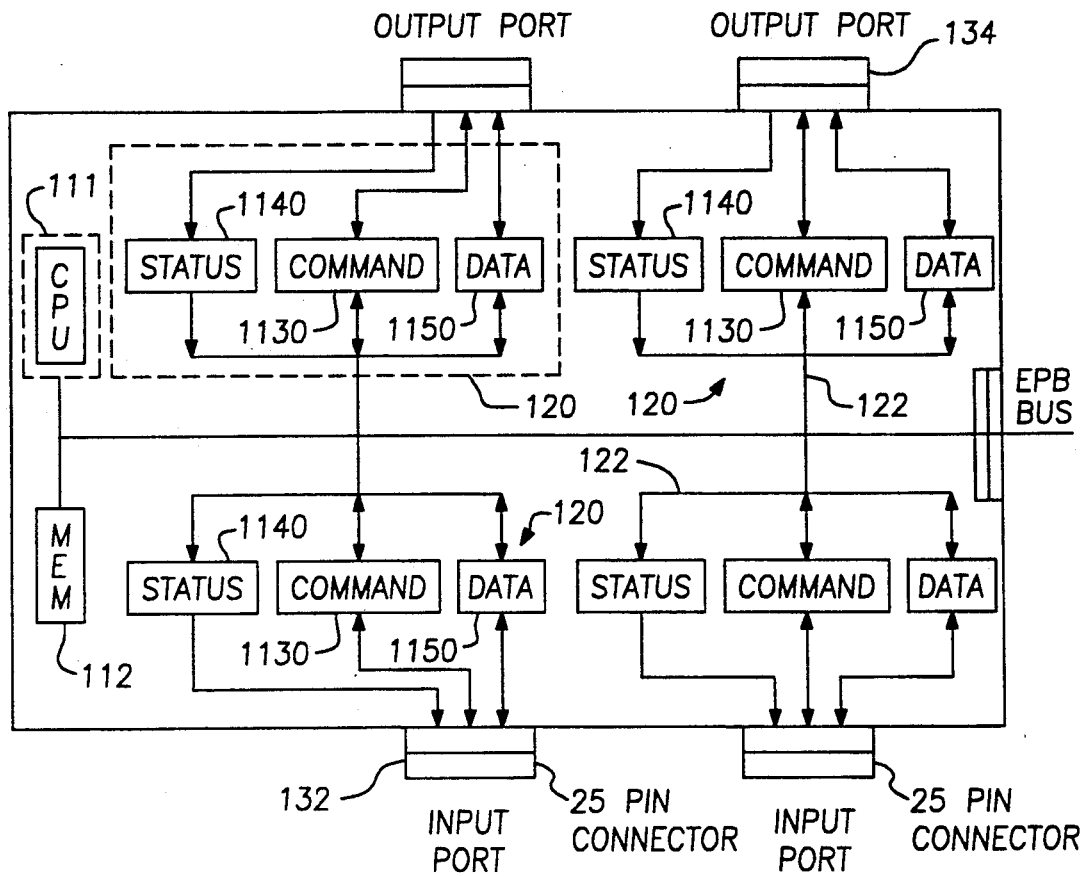
FIG. 3 is a block diagram of a printer buffer illustrating in detail the master buffer of FIG. 2.
Figure 4:
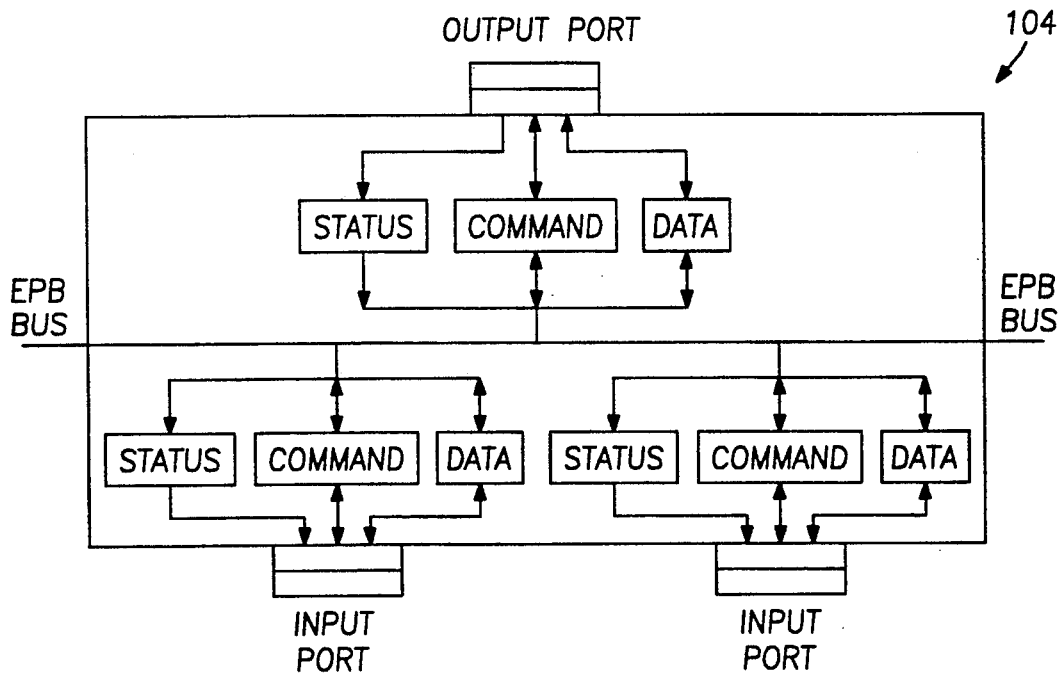
FIG. 4 is a block diagram of a printer buffer illustrating in detail the slave buffers of FIG. 2.

In reference to FIG. 3, master buffer 102 includes a central processing unit (CPU) 111, a memory 112, which may have the capacity of 256K bits to 4 megabits of memory as well as 4 storage devices 120. Each storage device is connected to an input port or an output port by an internal bus 122 which in turn is connected to the EPB bus. FIG. 4 is a block diagram of a printer buffer illustrating in detail each of the slave buffers 104 of FIG. 2. As shown in FIGS. 3 and 4, buffer 104 differs from buffer 102 only in that it has 1 fewer output port in the corresponding storage device and lacks the CPU 111 and memory 112 of buffer 102; the description below concerning the storage registers for storing status, command and data applies to the registers in the master as well as the slave printer buffers.

Each input port of the master or slave buffers may be connected to a personal computer (not shown) and each output port of the buffers may be connected to a printer (not shown). The storage devices 113o, 114o, 115o, 113i, 114i, 115i may simply be registers so that each storage device 120 has a data register, a command register and a status register. These registers perform essentially the same function as registers 12, 14, and 16 of FIG. 1A and 1B.

Figure 1A:
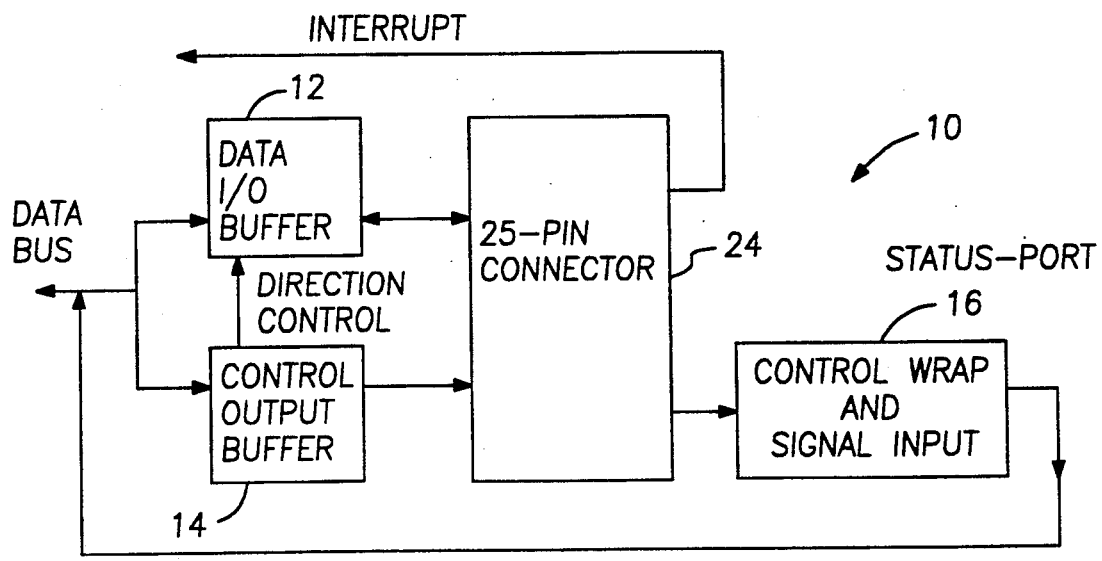
FIGS. 1A, 1B are block diagrams illustrating a conventional printer buffer design.
Figure 1B:
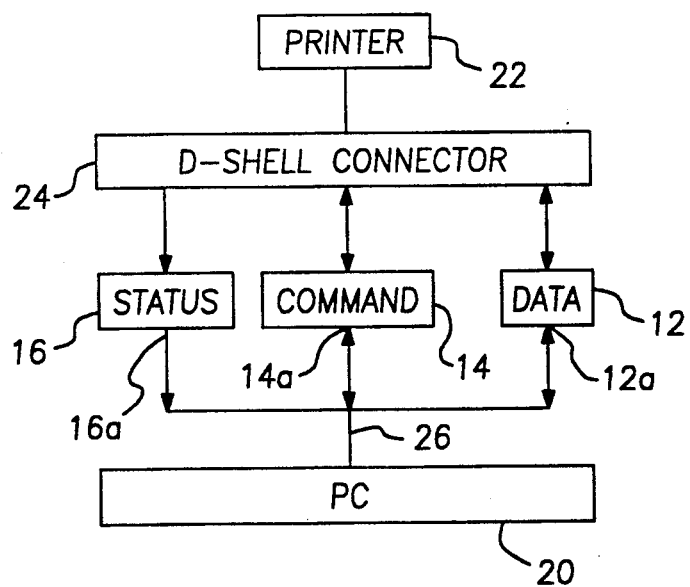

In the conventional design of FIG. 1A and 1B there is only one set of storage devices connected between the input and output ports of the buffer. In the system of FIG. 2-4, however, there are two separate storage devices 120, one connected to the output port and one to the input port, where the two storage devices are connected to internal bus 122 and to the EPB bus as well. The storage device connected to the output port then may be used to store current information on the status of the printer connected to the output port as well as data destined for the printer. The storage device connected to a personal computer through an input port is then used to store the data, command and status signals from the computer until a time determined by the CPU 111 when such stored signals may then be transmitted to or used for controlling the transmission of data to the printer through an output port for printing. To differentiate between the registers connected to an input port as compared to those connected to an output port, the registers connected to an output port are labeled with an "o" at the end (e.g., 113o, 114o, 115o) and those connected to the input port labeled with an "i" at the end (e.g., 113i, 114i and 115i).

When a user of a personal computer connected to input port 132 wishes to print certain data, the personal computer would send a control word to command register 113i in order to set bits 0, 3 of the register to 1, as in the conventional design discussed above. By setting the 0 bit of the command register 113i to 1, such status of the bit will be transmitted as an interrupt signal through one of the interrupt signal lines in the EPB bus to interrupt the CPU 111 in the master printer buffer. The value of the 0 bit of the command register 113i being 1 also causes the generation of a strobe signal causing data from the personal computer coming in through input port 132 to be latched into register 115i under the control of the strobe signal. Then the CPU 111 runs an interrupt service routine. The CPU 111 reads the content of the status registers 114o connected to all output ports such as output port 134 to determine whether any of the printers connected to the output port is idle.

In order for the current status information of the printers to be available for interrogation by the CPU 111, the status registers 114o is used. As in the conventional design, the printer connected to output port 134 would supply status information to update the content of status register 114o connected to port 134. Whether the printer connected to port 134 is busy or idle is indicated by bit 7 of the status register. In order to interrogate the content of status register 114o connected to port 134, as well as the content of status registers containing the status information of other printers connected to output ports other than port 134, CPU 111 would check bit number 7 of all the status registers. If the CPU 111 detects that one of the printers is idle, the CPU 111 sends out a word with a high value ("1") in bit 4 into the status register 114i in the storage device 120 (connected to port 132 in this case) which stores data from the personal computer which is to be printed. This is different from the conventional design where the printer would send out 4 (SLCT) bit of the status register 114i high or active which is then detected by the personal computer connected to port 132. The CPU 111 then sends a control word with high values of bits 0, 3 (STROBE bit, SLCT IN bit) to the command register 113o connected to the printer which is idle. Thus if the printer connected to output port 134 is detected to be idle by the CPU, such control word would be sent to the command register 113o connected to the idle printer through port 134. The data already latched into the data register 115i connected to port 132 is then transmitted through the EPB bus to the data register 115o connected to port 134. The high value of bit 0 in the control word sent by the CPU causes bit 0 of command register 113o connected to port 134 to be set to 1, thereby generating a "strobe" signal which latches the data present on the EPB bus (originating from the data register connected to port 132) into data register 115o connected to port 134. Thus the data originally from the personal computer connected to port 132 is therefore available to the idle printer connected to output port 134 for printing.

Figure 5:
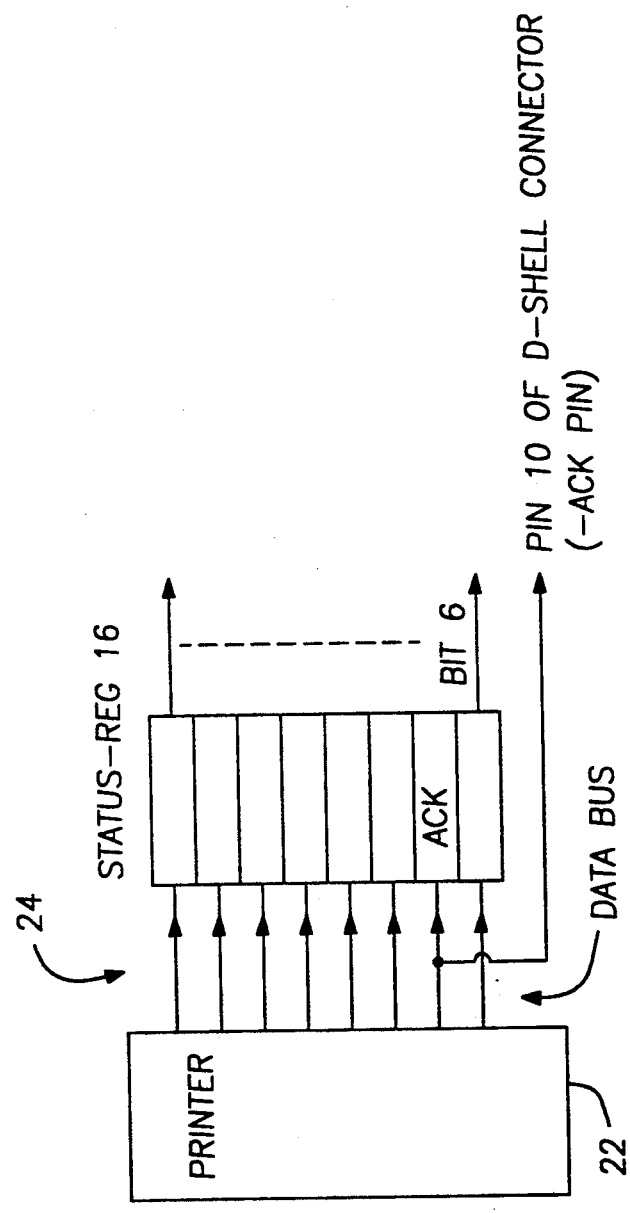
FIG. 5 is a schematic circuit diagram of the status storage 16, connector 24 and printer 22 of FIG. 1B to illustrate the invention.

The printer then acts on the data stored in to that in a conventional design. After the printer has accessed and received such data and is ready to accept another character, it returns a real-time status to the status register 114o connected to port 134, simultaneously sending back an "ACK 1" signal (pin 10 of D-shell connector as shown in FIG. 5) through the EPB bus to interrupt the CPU 111. Then the CPU transfers the content of the status register 114o connected to port 134 to the status register 114i connected to port 132. Then bit 6 of the status register 114i is an "ACK 2" signal through pin 10 of D-shell connector as an interrupt signal to interrupt the personal computer connected to port 132, to request the computer to send out the next character of data.

If no printer is idle, no control words from the CPU will be sent and the personal computer then waits for bit number 4 (SLCT) of the status register 114i connected to port 132 to be active at a later time. It will be noted that irrespective of which input port of the master or slave printer buffer is connected to a personal computer, and irrespective of which output port of the master or slave printer buffer is connected to a printer, the steps for transferring data and for controlling such transfer from a personal computer to a printer is the same as that described above.

Aside from increased efficiency, the abovedescribed system can also be modified slightly to permit the selection of different types of printers, such as laser printers or dot matrix printers. Thus the CPU would detect an idle printer as described above and set active the SLCT bit of the status register connected to the personal computer. When the personal computer detects that such bit has been set active, the personal computer sends a byte to the data register 115i connected to such computer, whereas such byte of data represents the code for the type of printer selected by the personal computer. The CPU then reads such bytes to determine whether the idle printer detected is the type indicated by the byte of data from the personal computer. If the idle printer is different from that indicated by the personal computer, the CPU would cause the SLCT bit to be pulled inactive in order to prevent the personal computer from sending out data for printing.

Where one master buffer and a plurality of slave buffers are employed in the same system as indicated in FIG. 2, the interrupt signals from the slave buffers are generated in a manner described above. These interrupt signals are sent through the INT0-INT3 in the EPB bus to the CPU. The CPU then treats these interrupts on a "first come first serve" basis; alternatively, the CPU may also "poll" the slave buffers instead.

The objectives of the invention are achieved by the various features described above. In order to add personal computers to the system, all one needs to add are cheap slave buffers and connect such buffers to the EPB bus. It is unnecessary to replace a conventional buffer by another with different number of input or output port. Furthermore, the user is permitted to select a particular type of printer if desired. While the invention has been described in an embodiment where the master printer buffer includes a CPU, it will be understood that the CPU may be a separate unit outside of the master buffer. While in the embodiment described above, memory 112 is used for storing the software and protocol for operating the CPU 111, it will be understood that such memory may form a part of the CPU; all such variations are within the scope of the invention. While the invention has been described above by reference to particular embodiments, it will be understood that various modifications may be made without departing from the scope of the invention which is limited only by the appended claims.

What is claimed is:

1. An expandable printer buffer system for controlling the flow of data from a plurality of data sources to one or more printers in response to data, status and command signals from the sources, said system comprising:

a plurality of buffers, each buffer having at least one or more input ports and one or more output ports, each input port connected to and receiving signals from a data source, each output port connected to a printer, each of said buffers including a first and a second storage means, the first storage means storing status signals for the printer connected to the output port of such buffer to indicate whether such printer is busy or idle and data signals destined for such printer, the second storage means storing data, status and command signals from the data source;

a bus connecting the buffers; and controller means connected to the bus for interrogating the first and second storage means of the buffers through said bus in order to detect whether the second storage means of any buffer stores any data signals provided by a data source and whether the first storage means stores any status signals indicating that any printer connected to any of the buffers is idle, wherein said controller means causes data signals stored in the second storage means of any of the buffers to be transferred to the first storage means of a buffer when the status signals stored in said first storage means of such buffer indicate that the printer connected to such buffer is idle, so that said data signals are available to such printer for printing.

2. The system of claim wherein said controller means is part of a buffer defined as the master buffer.

3. The system of claim 1, said system including a master buffer and four slave buffers.

* * * * *